March 23, 1954
LODOVICO D'INCERTI
ALSO KNOWN AS
VICO D'INCERTI
FOLDABLE FLASH LAMP
Filed Sept. 8, 1950
2,673,282
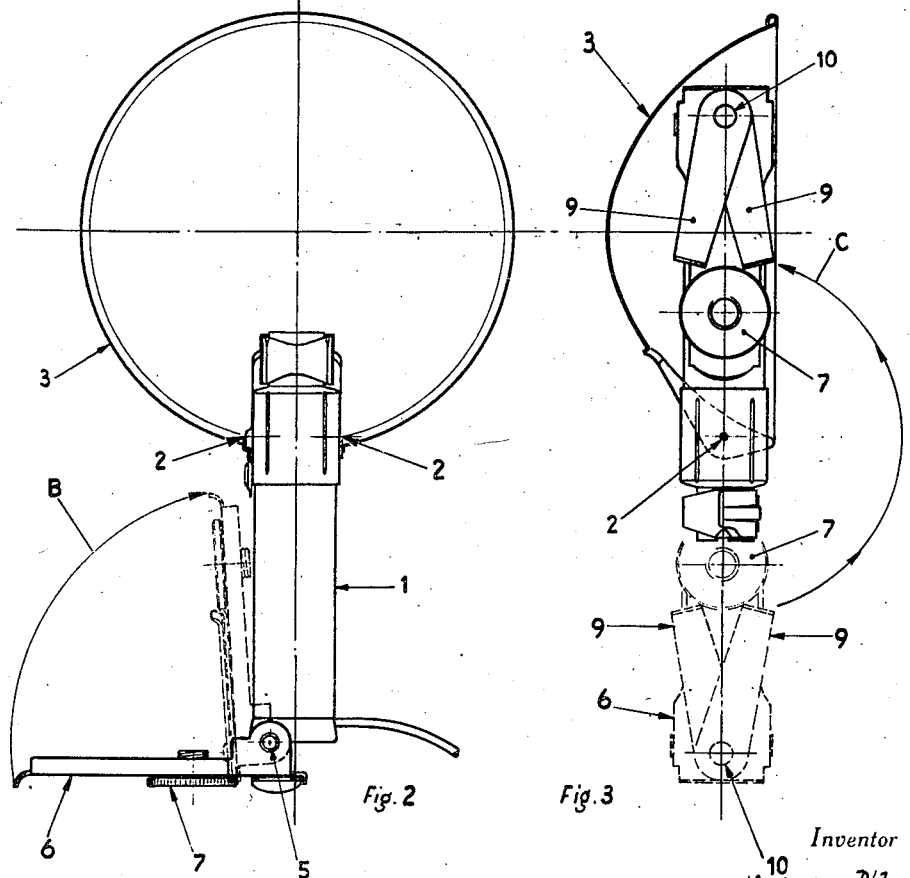
Inventor
Lodovico D'Incerti
By
Attorney Patented Mar. 23, 1954

2,673,282

UNITED STATES PATENT OFFICE 2,673,282

FOLDABLE FLASH LAMP

Lodovico d'Incerti, also known as Vico d'Incerti, Milan, Italy, assignor to Società Anonima Apparecchi Fotografici Ferrania, Milan, Italy Application September 8, 1950, Serial No. 183,726

Claims priority, application Italy August 8, 1950

2 Claims. (Cl. 240—1.3)

The invention relates to illuminating devices and relates more particularly to flashlamp devices of the type used in connection with photographic cameras for flashlight photography. Still more particularly, the invention relates to flashlamp devices that are foldable to small volume, for easy storage and carrying.

The invention has among its objects the provision of such a foldable flashlamp that is easy to manufacture, simple to operate and has only few parts, and which is provided with supporting means as well as with means for attachment to a camera.

The invention accordingly comprises the features of construction, combination of elements and arrangement of parts which will be exemplified in a construction hereinafter set forth and the scope of the application of which will be indicated in the claims.

In the accompanying drawings,

Fig. 1 is an elevational view showing the underside of a foldable flashlamp in accordance with the invention, the parts shown in solid lines in unfolded position, certain parts being also shown in broken lines in position of folding, Fig. 2 is a front elevational view of the device shown in Fig. 1, with all parts shown in unfolded position in solid lines, and a certain part also shown in folded position in broken lines, and Fig. 3 is a vertical sectional view taken centrally of Fig. 2, but showing all the movable parts in folded position in solid lines, and some of the parts also in unfolded position in broken lines.

A tubular element 1 carries near its upper end a bulb holder and is provided near the holder end with opposite pivots 2 in axial registry. A substantially hemispherical hollow reflector 3 is pivoted to said element at the pivots 2 and has a recess 4, as best shown in Fig. 1, for the passage of the holder during rotation of said element 1 about the pivot points 2. As shown in Figs. 2 and 3, said element 1 may be turned about said pivots 2 between a normal erected or active position wherein the holder is disposed in the reflector 3 and the remainder of the element extends down from the reflector and, respectively, a folded or inactive position wherein the element 1 together with all the parts thereof is disposed within the confines of the reflector 3 and the holder extends downwardly therefrom, in direction of an arrow C of Fig. 3.

An attachment member for a camera, such as a plate 6, is pivoted at 5 near the lower end of the element 1. Said plate 6 is movable from an unfolded position (shown in solid lines in Fig. 2), wherein it may be attached to a camera, to a folded position adjacent the tubular element 1 (shown in broken lines in Fig. 2), in direction of an arrow B. Means are provided on said plate 6, such as a screw 7, operable for threaded engagement with a thread in a camera for attachment thereto. Said screw 7 is provided with a knob and is normally disposed at one end of a longitudinal slot 8 that is formed in said plate 6, and is shiftable in said slot to the other end, the normal position of the screw 7 being shown in solid lines in Fig. 1, and the shifted position thereof in broken lines in that view.

Supporting means, such as two legs 9, are pivoted to the underside of said plate 6 and are movable to an erected position for supporting the flashlamp, as best shown in solid lines in Fig. 1. Said legs 9 are also movable to a folded position, in direction of arrows A of Fig. 1, wherein they are substantially within the contour of said plate 6 and form a small angle along the under surface of said plate 6; but before they can be moved to that position (which is shown in broken lines in Figs. 1 and 3), the screw 7 has to be moved to the shifted position so that the knob thereof clears the folding path of the legs 9.

The operation of above described embodiment is as follows:

The flashlamp may be stored and transported in folded position illustrated in solid lines in Fig. 3. If use of the flashlamp is desired, the operator will turn the tubular element 1 with all the parts thereon for about 180° in direction opposite to the arrow C of Fig. 3, while holding the reflector 3, until the element 1 assumes the erected or active position relative to the reflector 3 as shown in Fig. 2. During this turning movement, the tubular element 1 will rotate about the axis of the pivot points 2, and the lamp holder will pass through the recess 4 of the reflector 3. In the erected position of Fig. 2, the operator will insert a bulb into the bulb holder; then the operator turns the plate 6 about the axis of the pivot 5 from the folded position shown in broken lines in Fig. 2 into the unfolded position shown in solid lines in that view, in direction opposite to that of the arrow B. Thereafter, the flashlamp may be attached to a camera by means of the screw 7 which for that purpose will be shifted to its normal position shown in solid lines in Fig. 1. The legs 9 will be unfolded by moving them in direction opposite to that of the arrows A of Fig. 1, to support the flashlamp. After a flashlight exposure has been made with the camera, the latter may be removed from its attachment to the flashlamp, by loosening the screw 7. Thereafter, the flashlamp may be returned to its folded position by proceeding in a manner reverse to that described in connection with the unfolding.

Since certain changes may be made in the above article and different embodiment of the invention could be made without departing from the scope thereof, it is intended that all matter contained in the above description or shown in the accompanying drawing shall be interpreted as illustrative and not in a limiting sense.

What I claim is:

1. A foldable flashlamp, for use in connection with a photographic camera, comprising in combination: a tubular element including at one end a bulb holder, a reflector open in front and pivoted near said one end to said element and having a recess for passing said one end of said element when the latter is turned about said pivot between an active position wherein said holder is disposed inside said reflector and the element extends downwardly from said reflector and, respectively, an inactive position wherein said element is disposed within the confines of said reflector and said bulb holder projects downwardly therefrom, a plate pivoted to said element and movable therewith between the positions thereof and also tiltable between a folded station adjacent said element and respectively an unfolded station at an angle to said element, said plate having a longitudinal slot, a screw slidably engaged with said slot and arranged for threading into a camera body when said plate is in its unfolded station, and legs on said plate movable therewith, said legs being also displaceable relative to said plate to be unfolded for supporting said element and the reflector connected therewith when said plate is in its unfolded station, and said plate and said legs being disposed within the confines of said reflector when said element is in its inactive position.

2. In a foldable flashlamp as claimed in claim 1, said legs being pivoted to said plate.

LODOVICO D'INCERTI,
*Also known as Vico d'Incerti.*

References Cited in the file of this patent

UNITED STATES PATENTS

| Number | Name | Date |
|---|---|---|
| 1,044,689 | Pierce | Nov. 19, 1912 |
| 1,440,694 | Potstada | Jan. 2, 1923 |
| 1,543,293 | Nelson | June 23, 1925 |
| 1,658,189 | Embury | Feb. 7, 1928 |
| 2,479,716 | Benson | Aug. 23, 1949 |
| 2,543,926 | Mounique | Mar. 6, 1951 |

FOREIGN PATENTS

| Number | Country | Date |
|---|---|---|
| 522,303 | France | July 29, 1921 |
| 860,512 | France | Sept. 30, 1940 |